United States Patent [19]

Masae

[11] 4,049,251
[45] Sept. 20, 1977

[54] SHOCK ABSORBING STRUT ASSEMBLY
[75] Inventor: Watanabe Masae, Iwata, Japan
[73] Assignee: Yamaha Hatsudoki Kabushiki Kaisha, Japan
[21] Appl. No.: 639,778
[22] Filed: Dec. 11, 1975
[30] Foreign Application Priority Data
Dec. 12, 1974  Japan .............................. 49-142788
[51] Int. Cl.² ........................................... B60G 13/00
[52] U.S. Cl. .................................. 267/64 R; 280/708
[58] Field of Search ............ 280/708, 706; 267/64 R, 267/64 A, 65 R, 65 D; 188/314

[56] References Cited
U.S. PATENT DOCUMENTS

| 3,088,726 | 5/1963 | Dangauthier | 280/708 |
| 3,522,941 | 8/1970 | Biabaud | 267/64 R |
| 3,873,121 | 3/1975 | Ito | 280/708 |
| 3,909,035 | 9/1975 | Aikawa | 280/708 |

Primary Examiner—Robert R. Song
Attorney, Agent, or Firm—Harold L. Stowell

[57] ABSTRACT

Shock absorbing strut assembly comprising a telescopically extensible strut having therein an oil chamber of variable volume, a pressure accumulator comprising a spherical housing and a partition member provided in the housing and dividing the interior of the housing into two chambers, each of the chamber being divided by a flexible diaphragm into an oil compartment connected with said oil chamber and a gas compartment, the gas compartments being charged with gas of different pressures.

5 Claims, 3 Drawing Figures

SHOCK ABSORBING STRUT ASSEMBLY

The present invention relates to shock absorbing devices. More particularly, the present invention pertains to oleo shock absorbing strut assemblies having pressurizing gas chambers for applying pre-loading pressures to the oil contained in the assemblies.

In this type of strut assemblies, it is generally known that the load-to-stroke characteristics is primarily dependent on the volume and the initial or pre-loading pressure of the gas chamber. In cases where such oleo shock absorbing strut assemblies are applied to front fork assemblies of motorcycles, the aforementioned gas chamber is provided in the form of an accumulator outside the strut body, since adequate gas volume cannot be retained in the strut body to obtain a desired load-to-stroke characteristics. Even in this arrangement, however, due to limitation of available spaces in motorcycles, it is very difficult to establish an optimum shock absorbing property throughout a wide range of motorcycle operations.

For example, when such strut assemblies are employed in field racing motorcycles which are normally subjected to substantial shock loads, the gas chambers must be charged with gas of very high pressure so that an adequate shock absorbing capacity is provided. However, such substantial increase of gas pressure in the chambers results as an inevitable consequence in increase in the spring co-efficient of the strut assemblies whereby uncomfortability will be felt when the motorcycles are driven on normal roads.

It is therefore a primary object of the present invention to provide shock absorbing strut assemblies which can provide an increased shock absorbing capacity without increasing the volume and the preloading pressure of the gas chamber.

Another object of the present invention is to provide shock absorbing strut assemblies which has a gas chamber of limited volume but can provide adequate shock absorbing capacity with a relatively low pre-loading pressure.

A further object of the present invention is to provide shock absorbing strut assemblies in which load-to-stroke characteristics can readily be determined.

Still further object of the present invention is to provide shock absorbing oleo strut assemblies having gas chamber means which includes at least two separated gas compartments respectively charged with different levels of gas pressure.

According to the present invention, the above and other objects can be accomplished by shock absorbing oleo strut assemblies comprising telescopically extensible strut means defining therein oil chamber means of variable volume, means for resiliently biasing the strut means to an extended position, and pressure accumulator means having oil compartment means connected with said oil chamber means in the strut means, and at least two separated gas compartments, each gas compartment being at least partially defined by pressure responsive displaceable wall means, said compartments being respectively charged at different gas pressure. Means may be provided in the strut means or in an oil passage between the oil chamber means in the strut means and the oil compartment means in the accumulator means for providing viscous damping to telescopic movement of the strut means. The gas compartments are normally arranged so that they work in parallel relationship with each other but, alternatively, they may be arranged so that they work in series relationship with each other.

According to the features of the present invention, a desired load-to-stroke characteristics of the strut assembly can be selected by properly determining the volumes and the pre-loading pressures of the gas compartments.

The above and other objects and features of the present invention will become apparent from the following descriptions of preferred embodiments taking reference to the accompanying drawings, in which.

Figure 1:
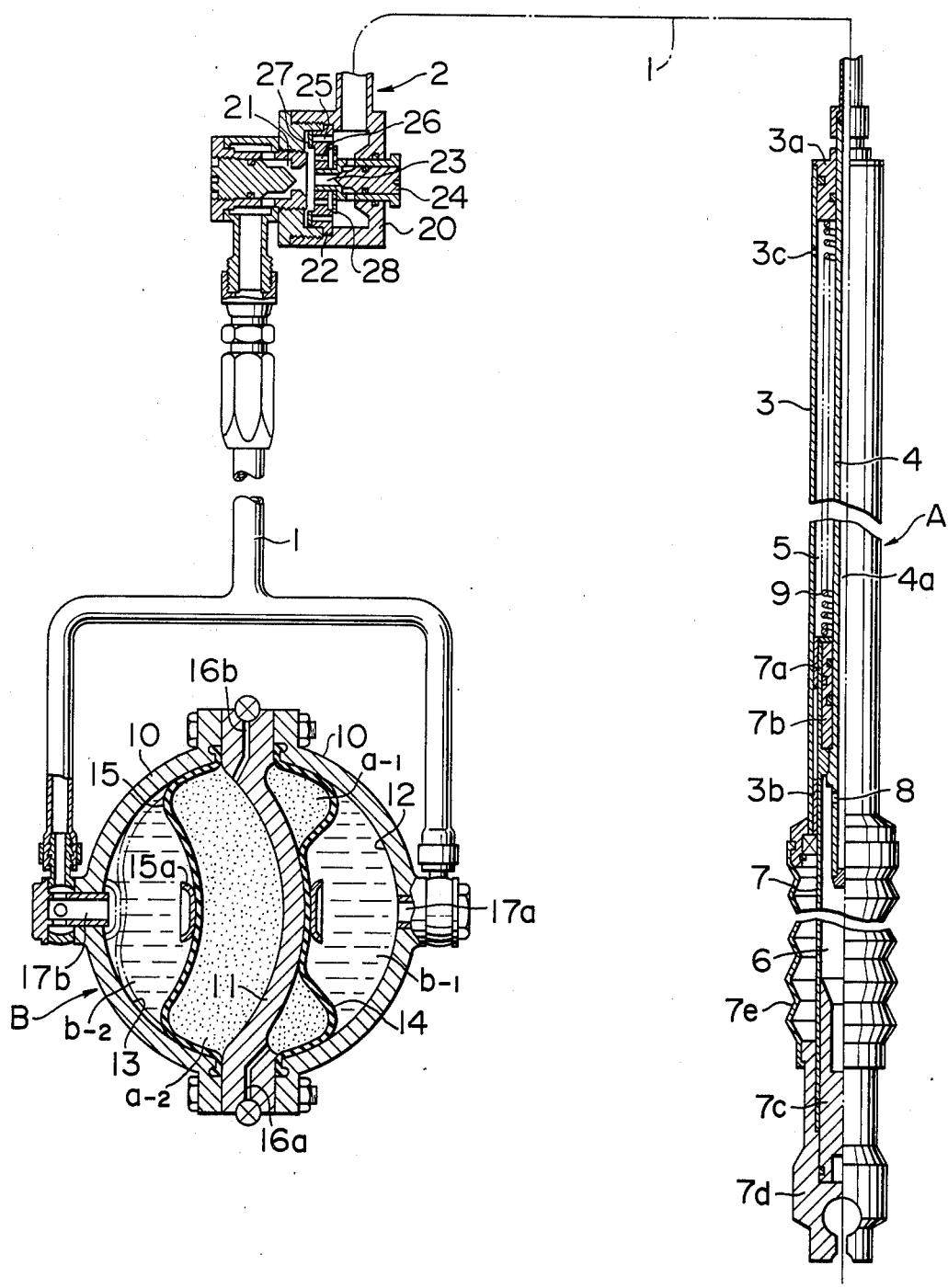
FIG. 1 is a part-sectional view of the shock absorbing oleo strut assembly in accordance with one embodiment of the present invention.

Referring now to the drawings, particularly to FIG. 1, there is shown a shock absorbing oleo strut assembly which is designed for use as a front fork of a motorcycle. The strut assembly comprises a pair of parallel telescopically extensible struts A, although only one is shown in FIG. 1. The strut A comprises an outer tube 3 having an upper end closed by an end cap 3a, and an inner tube 4 extending coaxially throughout the length of the outer tube 3 and having an upper end extending through the end cap 3a beyond the upper end of the outer tube 3. An annular space 5 is thus defined between the outer and inner tubes 3 and 4, and a lower tube 7 is so disposed that its upper end is slidably received in the space 5.

At the lower end of the outer tube 3, there is secured an annular guide member 3b along the inner surface of the tube 3. Similarly, an annular guide member 7a is secured to the upper end of the lower tube 7 along the outer surface thereof. Thus, the lower tube 7 is telescopically slidably combined with the outer tube 3. The lower tube 7 further carries a guiding and sealing member 7b which is adapted to slide along the outer surface of the inner tube 4.

The lower end of the tube 7 is closed by an end plug 7c so that a chamber 6 is defined therein. The inner tube 4 has one or more communication apertures 8 whereby the chamber 6 in the lower tube 7 is connected with a chamber 4a defined in the inner tube 4. At the lower end of the lower tube 7, there is secured a fitting 7d which is adapted to be mounted on the front wheel axle of a motorcycle (not shown). A bellows type protecting cover 7e is provided between the lower end of the outer tube 3 and the fitting 7d so as to protect the outer surface of the lower tube 7 from foreign material. A spring 9 is disposed in the space 5 so as to act between the end cap 3a and the upper end of the lower tube 7, whereby the lower tube 7 is normally urged toward the extended position. The space 5 is opened to atmosphere through a vent hole 3c formed in the tube 3 at the upper portion thereof.

The upper end of the inner tube 4 is connected through a conduit 1 having a viscous damping device 2 with a pressure accumulator B. The damping device 2 includes a housing 20 having an adjustable orifice 21 and a valve plate 22 disposed in the housing 20. The valve plate 22 has a central passage 23 which cooperates with an adjustable screw 24 to define a restricted orifice which is small in relation to the orifice 21. The valve plate 22 is further provided with axial passages 25 and restricted axial passages 26. The passages 25 are associated with check valves 27 which allow fluid flow only toward the pressure accumulator B. Similarly, the passages 26 are associated with check valves 28 which allow fluid flow only toward the strut A. The passages 25 are large in relation to the passages 26 so that substantially unrestricted fluid flow is allowed to pass through the valve plate 22 in the direction from the strut A to the accumulator B, but only a limited flow is allowed in the reverse direction.

The accumulator B comprises a spherical housing 10 which has a partition member 11 for dividing the interior of the housing 10 into two chambers 12 and 13. In the chamber 12, there is disposed a flexible diaphragm 14 which divides the chamber 12 into a first gas compartment a-1 and a first oil compartment b-1. Similarly, a flexible diaphragm 15 is disposed in the chamber 13 to divide it into a second gas compartment a-2 and a second oil compartment b-2. The partition member 11 is provided with gas charging passages 16a and 16b which respectively communicate with the gas compartments a-1 and a-2 and provided with appropriate charging valves.

The oil compartments b-1 and b-2 are connected respectively through connectors 17a and 17b and through the conduit 1 with the chamber 4a in the strut A. The chambers 4a and 6, the conduit 1 and the oil compartments b-1 and b-2 are filled with hydraulic oil and the gas compartments a-1 and a-2 are charged with pressurized gas. The initial or pre-loading pressures in the gas compartments are different from each other. In the illustrated embodiment, the pressure in the compartment a-1 is lower than that in the compartment a-2.

In operation, under a normal load condition, the diaphragm 15 in the chamber 13 is in the position as shown by a phantom line in FIG. 1 and only the diaphragm 14 is deflected. In the position of the diaphragm 15 shown by the phantom line in FIG. 1, the diaphragm 15 is maintained againt movement with a center cup provided thereon held against the inner wall of the oil compartment b-2. Thus, the pressure in the gas compartment a-2 does not have any influence on the oil pressure. When the motorcycle equipped with the strut assembly is running on a rough surface, the wheel associated with the struts A may be subjected to vertical shock loads causing contraction of the telescopic struts A. Upon such contraction, the volume of the chamber 6 is decreased and the hydraulic oil contained therein is displaced through the chamber 4a and the conduit 1 into the first oil chamber b-1 to cause a further deflection of the diaphragm 14, the amount of deflection being determined by the load and the initial pressure in the gas compartment a-1. As far as the shock load is such a level in that the oil pressure in the strut assembly does not reach the level of the gas pressure in the second compartment a-2, only the diaphragm 14 is deflected but the diaphragm 15 is maintained in the position shown by the phantom line.

As the strut A is further contracted, however, the oil pressure in the strut assembly reaches the level of the pressure in the second gas compartment a-2 before the diaphragm 14 reaches the extremely deflected position, whereby the diaphragm 15 is caused to deflect in accordance with the amount of shock load. This causes an increase in the effective volume of gas chamber and therefore results in a change in the spring co-efficient of the strut assembly. In a preferable arrangement, the gas compartment a-2 of higher pressure has a greater volume than the gas compartment a-1 of lower pressure, so that the former contains greater molar quantity of gas than the latter whereby the second gas compartment a-2 comes into function at a relatively early stage of operation.

Figure 3:
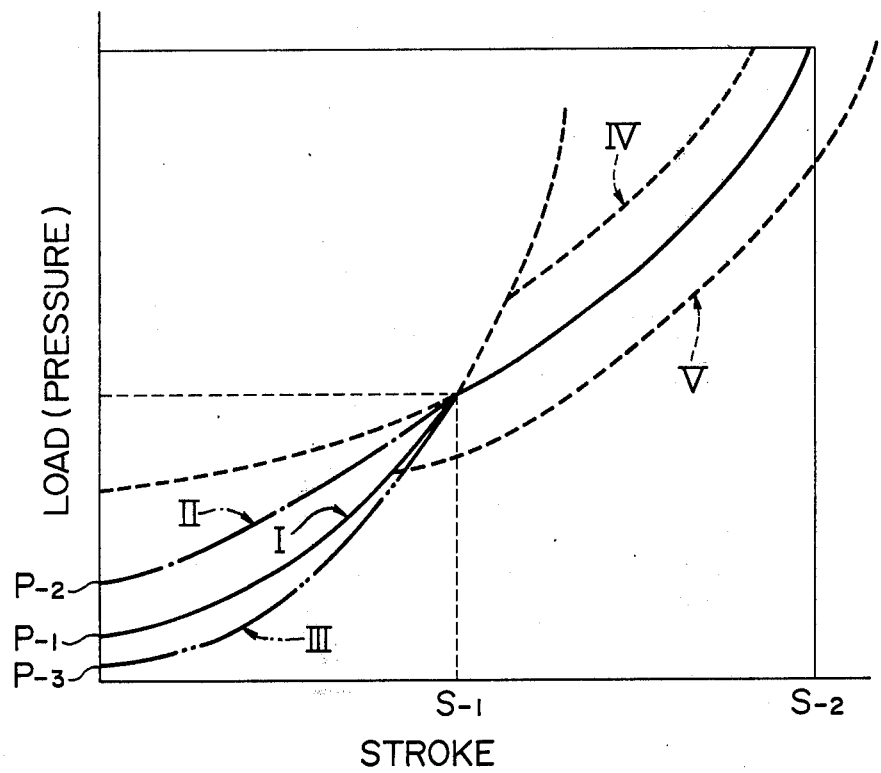
FIG. 3 is a diagram showing load-to-stroke characteristics of the strut assembly in accordance with the present invention.

FIG. 3 shows a typical load-to-stroke characteristics of the strut assembly shown in FIG. 1. In FIG. 3, it will be noted that, as the stroke or the contraction of the strut A increases, the oil pressure in the strut assembly increases along the curve shown by the solid line I. The point s-1 represents the position where second gas compartment a-2 starts to function. P-1 represents the initial of the pre-loading pressure in the first gas compartment a-1. When the preloading pressure in the first gas compartment a-1 is increased to p-2, the load-to-stroke characteristics becomes as shown by the curve II. Similarly, when the pre-loading pressure in the first gas compartment a-1 is decreased to a value shown by p-3, the characteristics becomes as shown by the curve III. Curves IV and V show the effects of changes in the pre-loading pressure in the second gas compartment a-2. When the volumes of the gas compartments are varied, the inclination of the curve will change. For the purpose, the gas compartments a-1 and a-2 may be partially filled with hydraulic oil. Thus, in the strut assembly of the present invention, a desired load-to-stroke characteristics can be obtained by properly selecting the volumes and the pre-loading pressures of the gas compartments.

Figure 2:
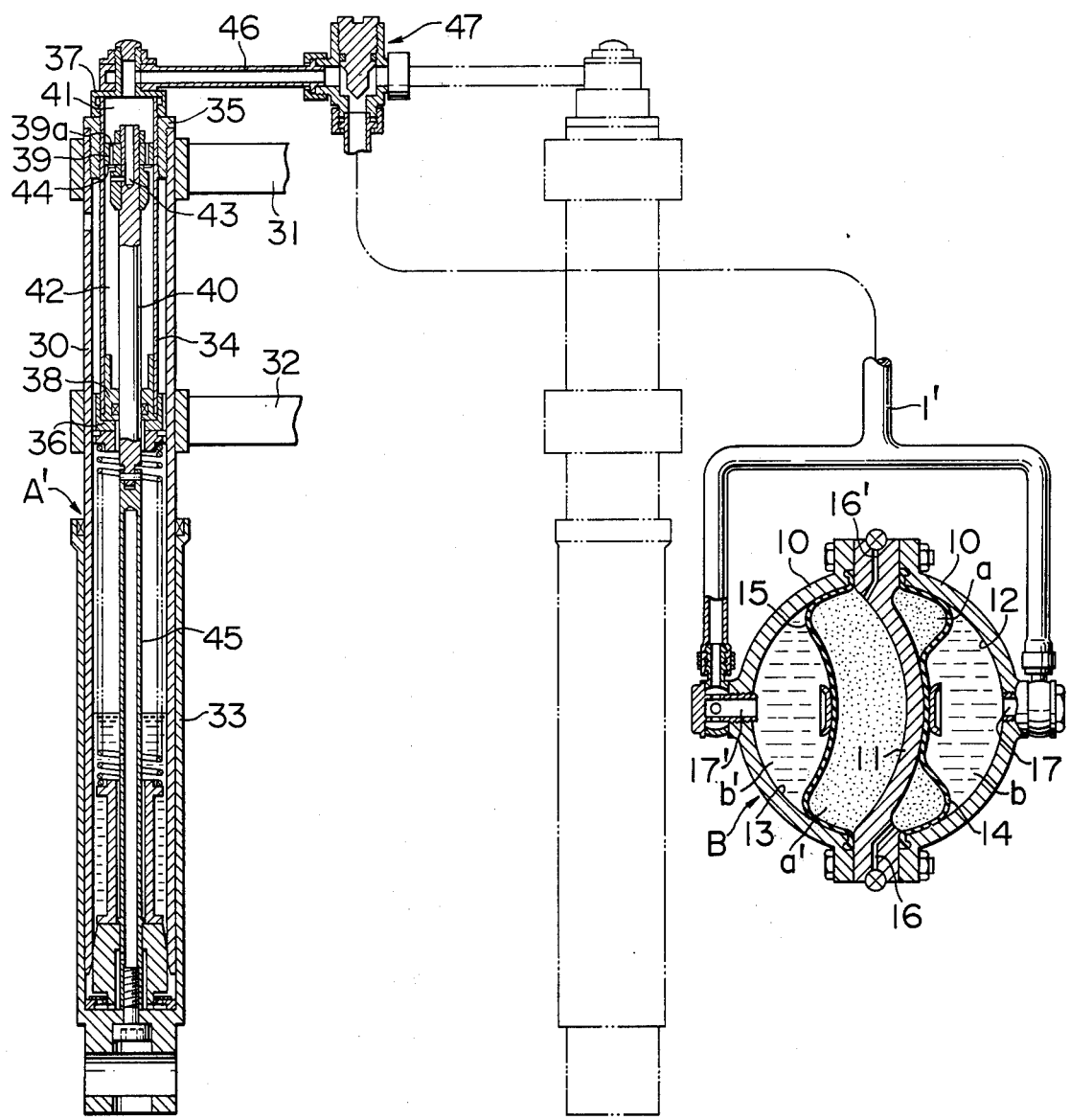
FIG. 2 is a sectional view similar to FIG. 1 but showing another embodiment of the present invention.

FIG. 2 shows another embodiment of the present invention, which comprises a pair of parallel struts A'. Each struts A' includes an upper tube 30 which is secured to upper and lower steering brackets 31 and 32. The upper tube 30 is slidably received at its lower portion by a lower tube 33 having a lower end adapted to be mounted on a front wheel axis of a motorcycle (not shown). In the upper tube 30, there is co-axially disposed an inner tube 34 which is secured at its upper end to the upper end of the upper tube 30 through a nut 35. The inner tube 34 is further supported by a radial support ring 36 which is provided at the level of the steering bracket 32. The inner tube 34 is closed at its upper end by an upper cap 37 and at its lower end by a bottom disc 38.

In the inner tube 34, there is slidably disposed a piston 39 which has a piston rod 40 extending downwardly through the bottom disc 38 of the inner tube 34. The piston 39 divides the interior of the inner tube 34 into an upper chamber 41 and a lower chamber 42 which are connected with each other by a restrict passage 43 formed in the piston rod 40. The piston 39 is formed with axial passages 39a which are associated with check valves so that fluid flow is allowed to pass only from the upper chamber 41 to the lower chamber 42.

The piston rod 40 is connected to an upper end of a hollow rod 45, of which lower end is secured to the bottom wall of the lower tube 33.

The upper chamber 41 in the inner tube 34 is connected through a conduit 46 having a flow restricting device 47 with a pressure accumulator B. Since the pressure accumulator B is identical in construction to that shown in FIG. 1, it will not be described in detail and corresponding parts are designated by the same reference numerals as in FIG. 1. It will be readily understood that the strut assembly shown in FIG. 2 functions in quite a similar way as in that shown in FIG. 1.

The invention has thus been shown and described with reference to specific embodiments, however, it should be noted that the invention is in no way limited to the details of the illustrated structures but changes and modifications may be made without departing from the scope of the appended claims.

I claim:

1. Shock absorbing oleo assembly which comprises telescopically extensible strut means defining therein oil chamber means of variable volume, pressure accumulator means, said accumulator means comprising a housing, said housing having a pair of oil compartments therein, each of said compartments being separated by a partition and each of said compartments being in communication without any restriction with said oil chamber means in the strut means, at least two separated gas compartments in said housing, a pair of pressure responsive wall means in said housing which separate the gas compartments from said oil compartments, and each of which is exposed to its respective oil compartment, said gas compartments being respectively charged at different gas pressures, means for holding the pressure responsive means in the gas compartment of higher pressure against movement when oil pressure in the oil chamber means is below a predetermined value so that the gas pressure in the gas compartment of the higher pressure does not have influence on the oil pressure.

2. Shock absorbing oleo strut assembly in accordance with claim 1 in which said gas compartments have different volumes.

3. Shock absorbing oleo strut assembly in accordance with claim 1 in which the gas compartment of higher pressure has greater molar quantity of gas than the gas compartment of lower pressure.

4. Shock absorbing oleo strut assembly in accordance with claim 1 in which the pressure responsive displaceable wall means in each gas compartment is a flexible diaphragm.

5. Shock absorbing oleo strut assembly in accordance with claim 1 in which said pressure accumulator housing is spherical and provided outside the strut means and having therein said pair of oil compartments and said gas compartments.

* * * * *